United States Patent
Pearce

(10) Patent No.: US 9,473,510 B2
(45) Date of Patent: Oct. 18, 2016

(54) SYSTEM AND METHOD FOR LOCATION VERIFICATION

(71) Applicant: GUARDTIME IP HOLDINGS LIMITED, Tortola (VG)

(72) Inventor: Jeffrey Pearce, Hilo, HI (US)

(73) Assignee: GUARDTIME IP HOLDINGS, LTD., Tortola (VG)

( * ) Notice: Subject to any disclaimer, the term of this patent is extended or adjusted under 35 U.S.C. 154(b) by 0 days.

(21) Appl. No.: 14/630,656

(22) Filed: Feb. 25, 2015

(65) Prior Publication Data

US 2016/0249176 A1    Aug. 25, 2016

(51) Int. Cl.
| | |
|---|---|
| H04L 29/06 | (2006.01) |
| H04W 4/02 | (2009.01) |
| G01S 19/13 | (2010.01) |
| H04W 12/00 | (2009.01) |
| H04W 12/12 | (2009.01) |
| H04W 12/08 | (2009.01) |
| H04W 12/06 | (2009.01) |

(52) U.S. Cl.
CPC ............. *H04L 63/107* (2013.01); *G01S 19/13* (2013.01); *H04L 63/0869* (2013.01); *H04W 4/028* (2013.01); *H04W 12/00* (2013.01); *H04W 12/06* (2013.01); *H04W 12/08* (2013.01); *H04W 12/12* (2013.01)

(58) Field of Classification Search
CPC ..... H04W 4/02; H04W 12/06; H04W 64/00; H04W 4/025; H04W 4/028; H04W 64/003; H04W 12/02; H04W 12/04; H04W 12/08; H04W 12/10; H04W 12/12; G01S 5/0257; G01S 11/06; G01S 13/878; G01S 19/06; H04M 2242/30; H04L 63/08; H04L 63/061; H04L 63/06; H04L 63/0823; H04L 63/0869; H04L 63/105; H04L 63/107; H04L 63/123; H04L 9/3263

See application file for complete search history.

(56) References Cited

U.S. PATENT DOCUMENTS

| | | | |
|---|---|---|---|
| 8,719,576 B2 * | 5/2014 | Buldas | G06F 21/64 |
| | | | 713/168 |
| 9,122,846 B2 * | 9/2015 | Buldas | G06F 21/64 |
| 9,178,708 B2 * | 11/2015 | Gault | H04L 9/3297 |
| 9,268,969 B2 * | 2/2016 | Gault | G06F 21/645 |
| 2009/0233622 A1 * | 9/2009 | Johnson | H04W 64/00 |
| | | | 455/456.3 |
| 2013/0276058 A1 * | 10/2013 | Buldas | G06F 21/64 |
| | | | 726/2 |

* cited by examiner

*Primary Examiner* — Magdi Elhag

(57) ABSTRACT

Location data from one or more geolocation engines such as GPS, a system that determines location from relative signal strengths or transit times, etc., within and/or connected to a device, such as a mobile phone, vehicle, movable electronic device, computer, etc., is included in a digital record that submitted to obtain a digital signature such that the presence of the device at the particular location can later be proven. The digital record may include data that encodes a message, as well as other parameters such as time. The digital signature may include recomputation parameters for recomputing a verifying calendar value, formed by a keyless, hash tree-based signing infrastructure as an uppermost hash value in a calendar period.

43 Claims, 11 Drawing Sheets

SYSTEM AND METHOD FOR LOCATION VERIFICATION

TECHNICAL FIELD

This disclosure relates to systems and methods for verifying the location of a client system.

BACKGROUND

It is often necessary for an entity to verify the location of a particular device. The entity may possess the device, or an employee or customer of the entity may have it, etc. Indeed, in some cases, the owner/user of the device may himself wish to prove where he (or at least the device in his control) was at a given time.

To establish the device's location, the entity may even today receive a plaintext or graphical indication of the geolocation from the device. For example, many smart phones have a built-in geolocation engine, such as a Global Positioning System (GPS) sub-system, which interfaces with an internal or network-accessible mapping routine. However, the transmitted indication may be spoofed, for example, by substituting an indication of another geolocation.

In some cases, system administrators—either human or automated—can locate a device using existing technology. For example, even now, administrators of mobile telephones can locate a telephone (n particular, its SIM card) approximately by sensing the strength of its transmission at different cell towers. One disadvantage of such known multilateration/hyperbolic capabilities is that they do not provide a method to verify such geolocation information to an acceptable degree of reliability.

There is a need for a system that provides non-repudiable evidence of the entity's location that can be verified to a high degree of reliability.

DETAILED DESCRIPTION

Figure 1:
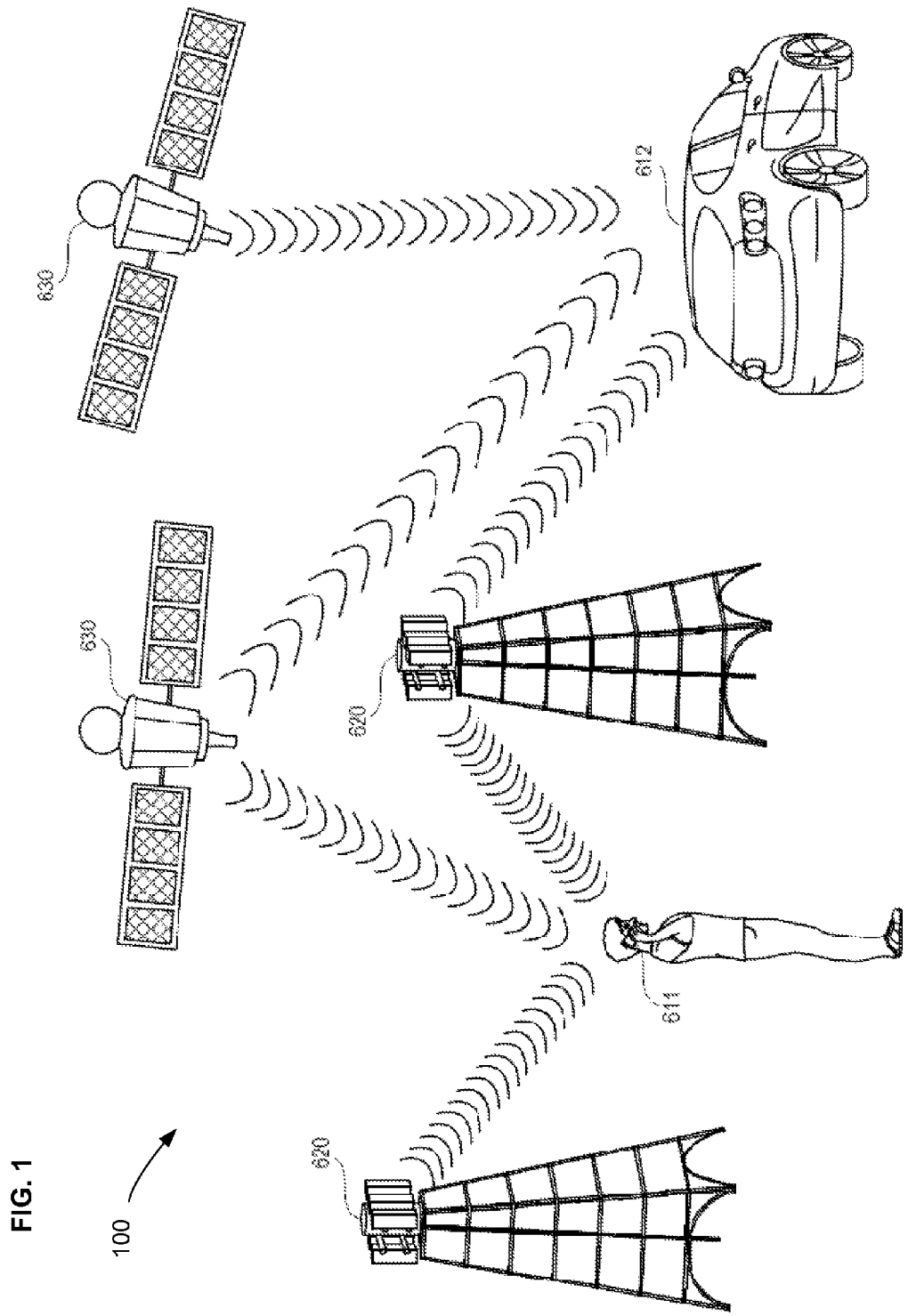
FIG. 1 illustrates a system configured to determine geolocation.

Embodiments of the invention enable geolocation of a device with strong verifiability. FIG. 1 illustrates one of many possible examples of a system 100 configured to verifiably establish the geolocation of one or more devices operating within the system. In FIG. 1, a user of a mobile phone 611 and a communication system in a car 612 are shown as transmitting to reception systems such as cell phone towers 620 and/or satellites 630. As the number and type of wireless devices continues to increase and spread, so too will the possible uses of the invention. Note that it is not necessary for the device tracked by the geolocation system according to embodiments of the invention to itself be mobile, or at least not intentionally. For example, the system may be used to detect and prove that a device that is not supposed to move, for example, beyond or to within some boundary, has in fact done so. It would also be possible to incorporate the invention into a device that is independent of human interaction, or is remotely controlled. For convenience, the term "device" is used to mean anything that includes or can receive data from a geolocation engine and whose location is to be verified with a data signature.

Figure 2:
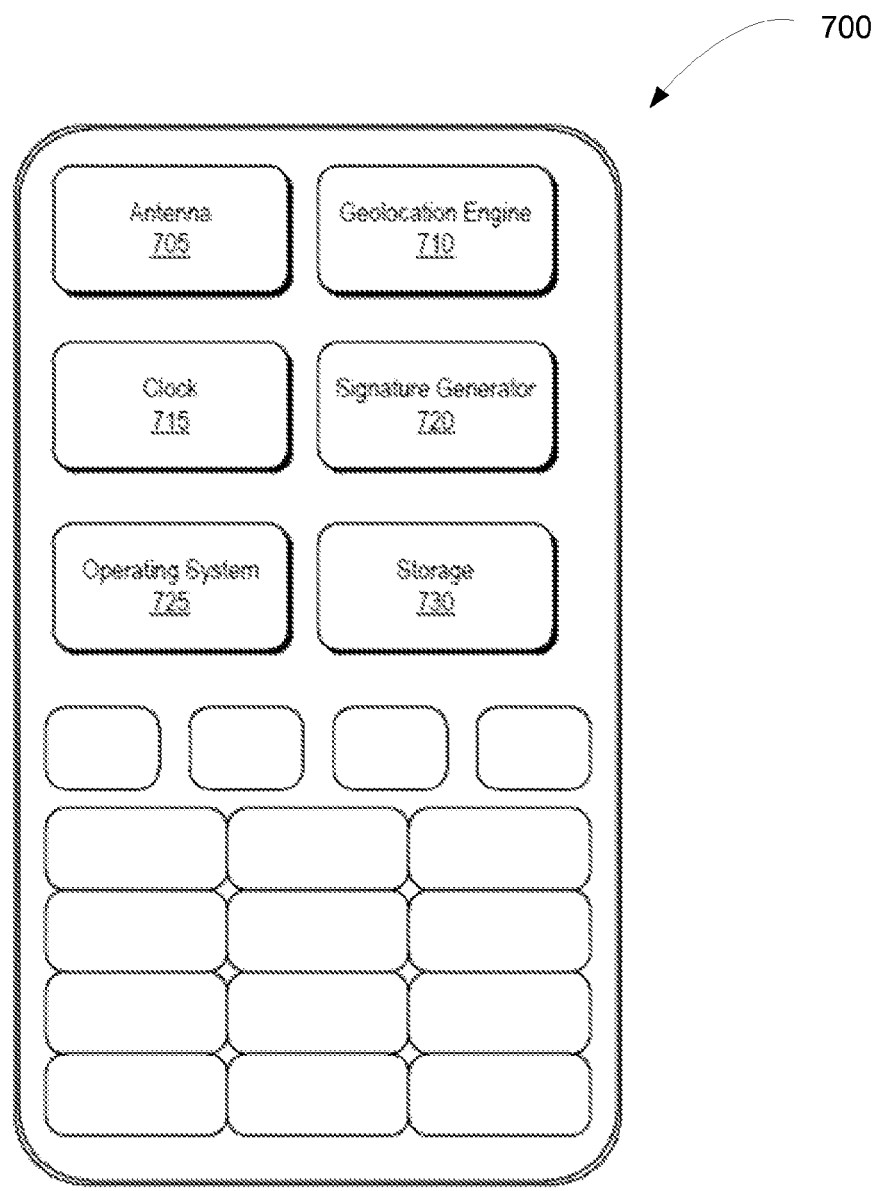
FIG. 2 illustrates an embodiment of a phone able to obtain a digital signature of geolocation data, for example, using a distributed, hash tree-based verification infrastructure.

FIG. 2 illustrates an embodiment of a mobile device 700 configured to determine its current location and to request a corresponding data signature. The device 700 will typically include one or more antennas or tranceivers 705, which may allow the phone to exchange data with a cell tower, satellite (such to acquire GPS signals, signals transmitted from the Iridium constellation of satellites, etc.), Wi-Fi base station, and/or the like in order to perform its nominal function, such as telephony, as well as to determine a geolocation and/or to communicate with a remotely located entity.

The device 700 includes at least one geolocation engine 710 configured to compute a current location. As mentioned above, the geolocation engine 710 determines a current location of the device 700 based on any or a plurality of the various forms of information available to the device 700. One example of a suitable geolocation engine would be a GPS receiver and processor. Another example would be any known transmission and/or receiver and processing systems that process multiple signals using tri- or multilateration. For example, cell towers and Wi-Fi base stations may have known, fixed locations, so if the device 700 is within communication range of or connected to a particular transmitter, it may know that it is within a certain distance of the particular cell tower and/or Wi-Fi base station to which it is connected. The geolocation engine 710 may compute a current location based on such pseudoranges to one or more transmitters with known locations, such as satellites or transmitters with fixed locations on earth. Various methods are well-known for computing a location estimate based on a plurality of signals, or signal pairs. Although the geolocation engine is shown as a single component in the figures, this is only to represent the collection of whichever hardware and software components are included in the device to acquire, receive, and interpret geolocaiton information from the various sources and as such, represents in some cases more than one "engine". For example, the GPS circuitry and processing software in a mobile phone will in general be different from the circuitry and processing software that determines position based on multilateration from cell phone towers.

There are many examples of geolocation systems that the invention can accommodate, based on methods such as tri- or multilateration, tri- and multiangulation, direct measurement, differential signal arrival times, etc. For example, measured signal strengths and/or round-trip signal transit times to a plurality of communication towers (such as mobile phone towers) can allow for tri- or multilateration. Just one example often found in GSM-based telephone systems, according to the radio resource location services (LCS) protocol (RRLP) uses Enhanced Observed Time Difference (E-OTD) measurements within the phone, which involve differences in time of arrival of bursts of base station pairs. Another example is GPS and its algorithms based on precise times and other well-known orbital parameters, as well as correction signals transmitted from fixed stations in a Differential GPS configuration. Previously common hyperbolic navigation methods such as LORAN and DECCA use relative differences in time-of-arrival between master and slave radio transmitters, etc. Regardless of which geolocation method—or combination of methods—is used in the device 700 by the geolocation engine(s) 710 (which may comprise more than one geolocation mode, such as both GPS and relative signal strength of transmissions between mobile phones and cell tower), what is relevant to embodiments of the invention is that all such systems produce location data that either directly, or after proper processing, provide position information, such as such as latitude/longitude/altitude, other grid coordinates, in any coordinate system, etc. The location data will typically include other information as well, such as tower or satellite ID, time, signal propagation information, information about the transmission system itself, such as GPS orbital parameters, etc. The geolocation engine(s) may be built into the device and/or may be added by a user after manufacture.

The concept of geo-"location" may also include orientation or movement information; that is, "location" may mean any point in an n-dimensional parameter space that need not be limited to instantaneous position in some fixed, linear coordinate system. For example, depending on which sensors or algorithms are included within the device 700, geolocation data might also include such information as angular positions about x-, y- and/or z-axes (such as roll, pitch, yaw), "upside down" vs. "rightside up", velocity v and acceleration a (in one or more directions), position expressed in terms of bearing/range, Cartesian or non-Cartesian coordinates (such as lat/long/altitude, hyperbolic coordinates, time-difference coordinates, etc.). The signals for such values may in such cases then be taken and converted or computed from suitable sensors such as airspeed or flow sensors, accelerometers, location difference values (such as a change in GPS-fixed position over time), etc. Coupled with a reliable (and, in one embodiment described above, later verifiable) indication of time, at least one embodiment of the invention can establish for later verification not only the position of the device 700, but do so at a verifiable time, possibly together with a verifiable indication of other information such as motion and acceleration (etc.) data as well. Extraction and signature of such information might be useful, for example, for flight data recorders ("black boxes"), in which case signature of the location (and other) data could be done and recorded as part of the data recording itself, or when the recorder casing is opened for inspection In general, embodiments of the invention may thus accept or compute, as a location data set A, any or all of n positional or motion vectors such as, for example, $\Lambda = \{(\bar{x}_1, \bar{v}_1, \bar{\alpha}_1, \bar{\omega}_1, \dot{\bar{\omega}}_1), \ldots, (\bar{x}_n, \bar{v}_n, \bar{\alpha}_n, \bar{\omega}_n, \dot{\bar{\omega}}_n)\}$ where $\bar{x}_j, \bar{v}_j, \bar{\alpha}_j, \bar{\omega}_j, \dot{\bar{\omega}}_j$ are the j'th position (of any dimension), velocity, acceleration, and rotational velocity and rotational acceleration coordinates, for example, from a j'th geolocation sub-system in the device. For example, if a mobile phone uses both GPS and location based on multilateration between it and several cell phone towers, there could be at least two sets of coordinates, although possibly not rotational data, and possibly not with velocity or acceleration data. As is made clearer below, such data will typically be only a subset of the data that is submitted as a request for signature.

In some embodiments, the data to which the geolocation engine 710 has access may not be generally accessible to users of the device 700. For example, the geolocation engine 710 might have access to identification information for a cell phone tower or Wi-Fi base station, MAC addresses, and/or the like. The geolocation engine 710 may have access to frames (such as GPS frame data) or packets transmitted by transmitters with known locations for the purpose of determining geolocation. The geolocation engine 710 may also have access to pseudoranges and intermediate calculations used by the geolocation engine 710 to determine the current location. The intermediate calculations may include calculations to determine the location of the transmitters and/or calculations to determine the location of the device 700.

A signature generation module 720 is configured to format a digital data record and to generate or, using an infrastructure as shown in FIGS. 6-10, obtain a digital signature that can be used to verify a current geolocation of the device 700 at the time the signature is obtained. Because geographic coordinates may be spoofed or possibly manipulated by the user himself, the digital record may include various types of additional information that would be more difficult for an attacker trying to spoof or fake a location to determine. For example, any of the lower level data generated by or known to the geolocation engine 710 could be included in digital records. It may, for example, be somewhat more difficult for an attacker to determine pseudoranges, cell tower and/or Wi-Fi base station identifiers, a calculated position of a moving transmitter, and/or the like.

The general concern will be the following: Assume that a user U wishes to fake the whereabouts of the device, for example, to create an alibi for himself at location L1. He then gets a friend F in location L2, to compile and send to him the location parameters (such as GPS coordinates, time t, etc.), to which U adds in his own local data, such as phone SIM, and submits this for signing. U then later claims to have been at L2 at time t, and also presents the faked input data, along with the signature, as proof. There would be other ways to fake location data, for example, by spoofing the GPS signal and thereby fooling the GPS engine within the device into outputting incorrect location data. It is for this reason that it is preferable, although not absolutely necessary, to require additional corroborating input data, such as coordinates and multilateration data derived from a secondary source such as cell phone towers, multiple time indications, such as phone network time, GPS-derived time, etc., which must agree to within some margin with the time corresponding to the signature, etc. Although even this may not defeat the efforts of a sophisticated faker, it will still in many case be beyond the capabilities of most ordinary users, and therefore more reliable than what the prior art offers, for example, as forensic evidence in a trial.

It would also be possible to include, in a digital record, either pre-stored, computed, or user-input user-identifying information such as a key, a password, etc. Note that, if the Guardtime signing infrastructure described below is used to create digital signatures, then such a use of keys would not be a requirement of that infrastructure itself but would simply be another parameter included in the signature request to make it harder for an attacker to hack, spoof or fake the request.

Figure 3:
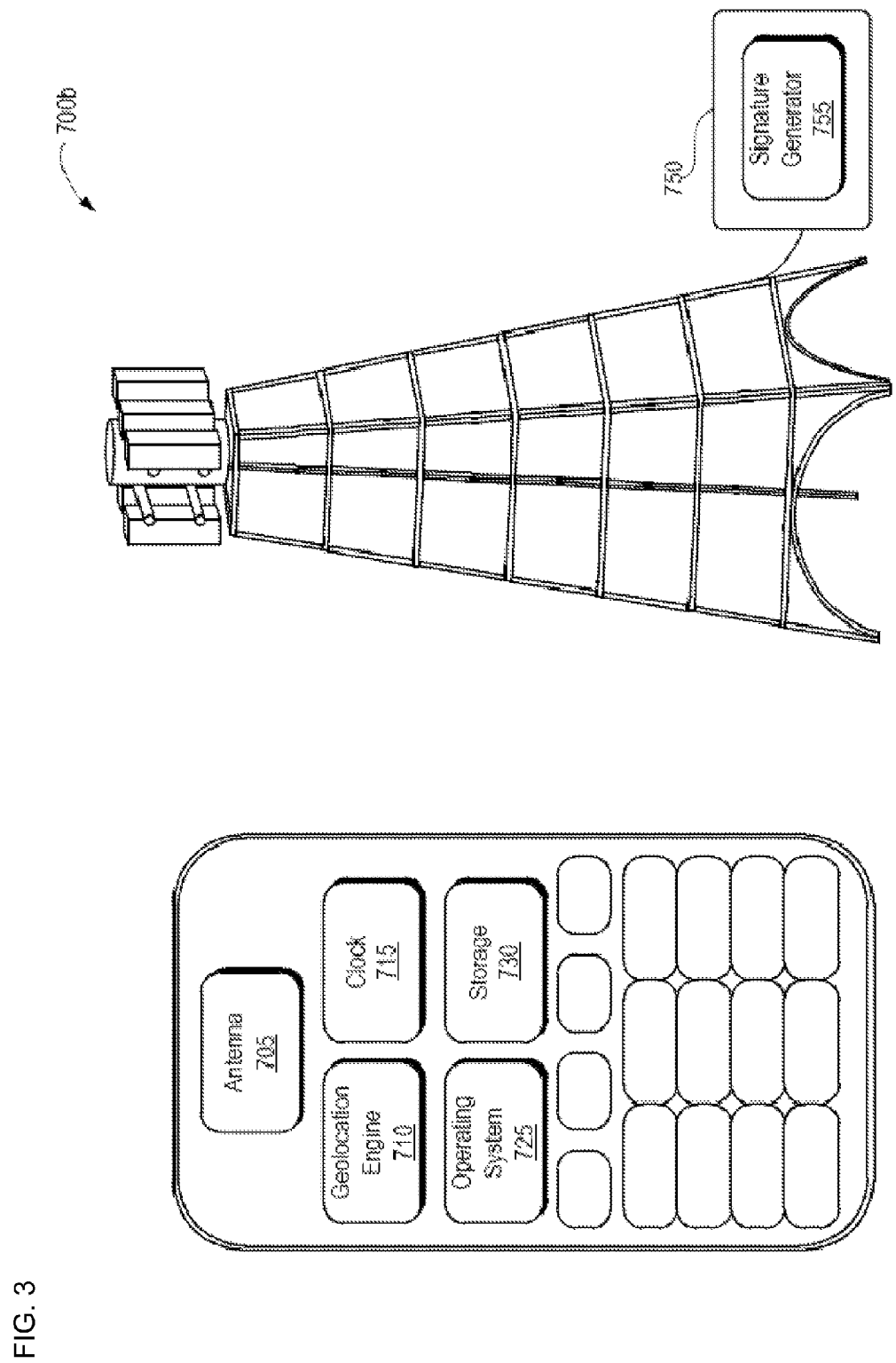
FIG. 3 illustrates an alternate embodiment of a system able to digitally sign a current geolocation.

FIG. 3 illustrates an alternate embodiment in which the signature generation module 755 is included in a system external to the device itself, but in communication with it, such as in a cell tower base station 750 for a phone. The phone may transmit any information needed by the signature generation module 755 to the base station 750, possibly even without the user of the device knowing this. Although not illustrated, the phone may include any hardware or software necessary to acquire and/or aggregate the necessary information and send it to the signature generation module 755.

As just one of many possible examples of additional information that might also be included in a signature request could be some sub-set, or even all, of the GPS frame data used to determine the current position. Some examples of possibly useful words include:

the pseudo-random codes the respective satellites transmit as IDs;

the ephemeris data, which has the advantage that it generally includes the date and time used in the calculations used to determine the position of the GPS receiver, which should then match, to within some time margin, the system time of the device 700, and/or of the signature time encoded within the corresponding digital signature; and the almanac data, which would require an attacker trying to fake geolocation data to know even orbit information of the satellite transmitting location information.

A digital record may include, as just a few examples, additional arguments in a digital input record relating to the system that generates the raw geolocation data such as:

telemetry words 811 and/or handover words 812 from one or more sub-frames. For example, a handover word 812 received closest in time to when a position fix is acquired and/or used to compute the geolocation may be included;

clock correction, accuracy, and system health data 815 received from one or more transmitters;

ephemeris data 825, 835 from one or more transmitters;

almanac data 845, 855 for all possible transmitters and/or a smaller set of transmitters selected according to a predetermined method; and ionospheric model data.

If at least some of the GPS frame parity (checksum) data is included in the signature request, along with the data that the parity bits are derived from, then this would add an additional level of difficulty in faking the location of the device, since it would constitute a form of "built-in" security algorithm, namely, the GPS checksum for the received frames or sub-frames.

Figure 4:
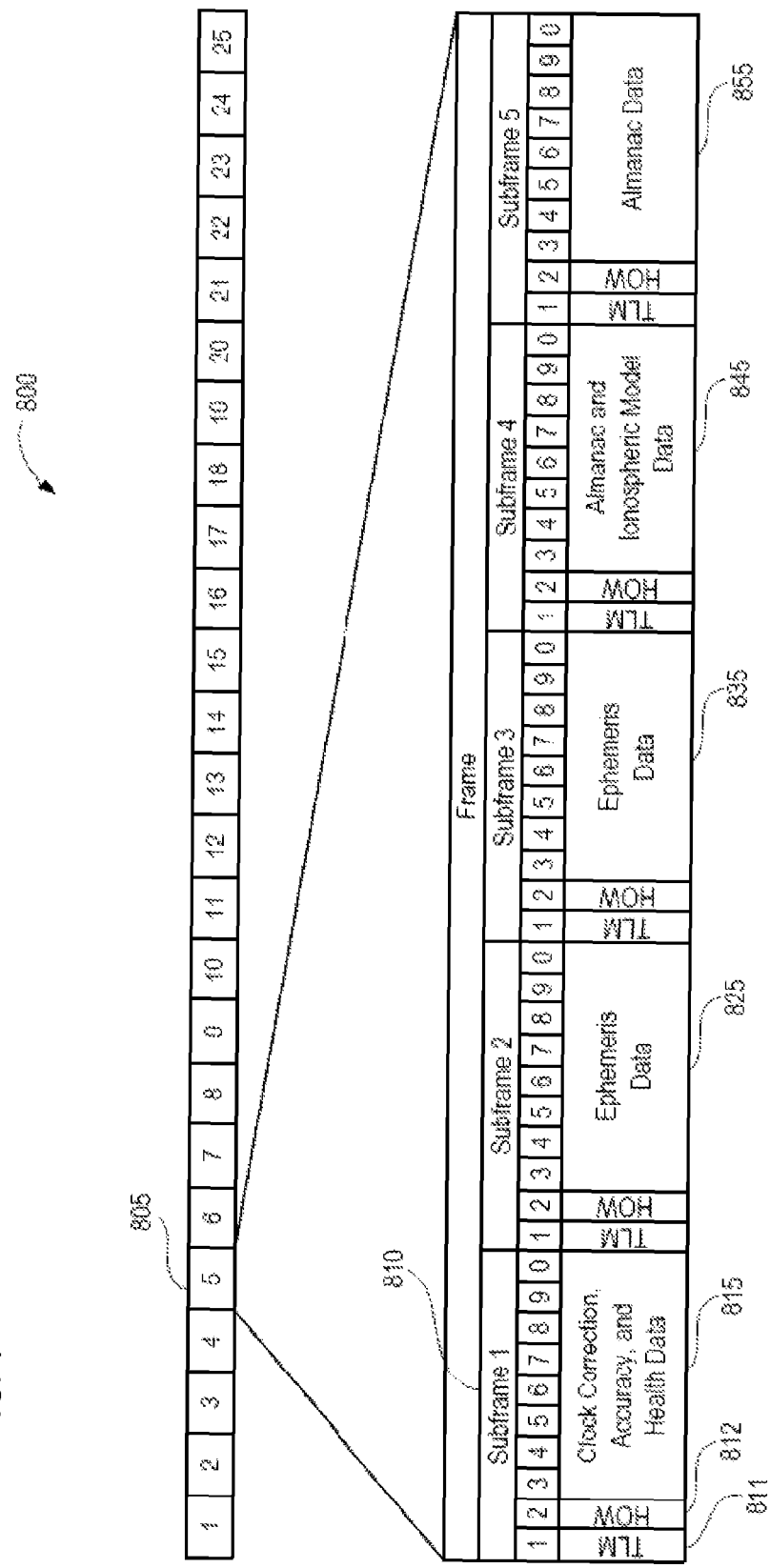
FIG. 4 shows exemplary data sent by a transmitter with a known location.

FIG. 4 shows one of substantially unlimited examples of data 800 sent by a transmitter, in this case, a GPS satellite, with a known location. As is known, a GPS transmission typically includes a plurality of data frames (e.g., the data frame 805), each of which may include a plurality of sub-frames (e.g., the sub-frame 810). The sub-frames may include various forms of information that can be included in digital records. The frame and/or sub-frame from which information is extracted may then be selected according to a predetermined algorithm. For example, a frame or sub-frame closest in time to when a position fix is acquired may be selected, and/or a frame including information related to satellites visible to the geolocation engine. For information that changes very slowly or not at all, it may not matter which frame it is taken from. The digital record may include information from all transmitters visible.

Different events may be used as triggers to start the process of compiling location data and having it, along with any other desired data, signed. One simple trigger event could be a direct request by the user, for example, by tapping on a screen icon, push a button, or entering a command that the device's operating system can interpret. The signal triggering location determination and signature might also be received from an external source, such as a system administrator, a law enforcement agency, an authorized third party (such as a parent), etc. Another option would be for the geolocation/signature procedure to be triggered automatically, or periodically, according to a schedule, or, for example, when the device is powered on or off, or when the user accesses or attempts to access or run some feature or application within the device, such as talking a photo, making or receiving a call (possibly from any number or a white or black list), etc., a change in path outside some preset limit, for example, a change in flight path of a plane, change in car route, path, moving outside of or inside of some predetermined boundary, etc.), and/or the like. Other of the substantially countless examples of triggers could be: sensing that a user has been away from (or using) the device for more than some threshold time; sensing that a person has entered some monitored area; sensing an attempt at physical intrusion into or removal of the device, etc. Note that such trigger events could occur without the knowledge of the user, in which case the geolocation/signature routines may also be run substantially anonymously, as background processes. In fact, essentially any pre-defined or even randomly occurring event may form a trigger as long as its occurrence can be sensed.

Upon sensing a trigger event, the signature generation module will then input data indicative of a current location from the geolocation engine, which in turn may either create this data itself, or it may retrieve this data from an external source, or both. For example, the signature generation module might submit a request or query to the geolocation engine for the data in response to the trigger event. The signature generation module might then submit commands to an operating system (e.g., Android, iOS, etc.) requesting data from the geolocation engine.

Figure 5:
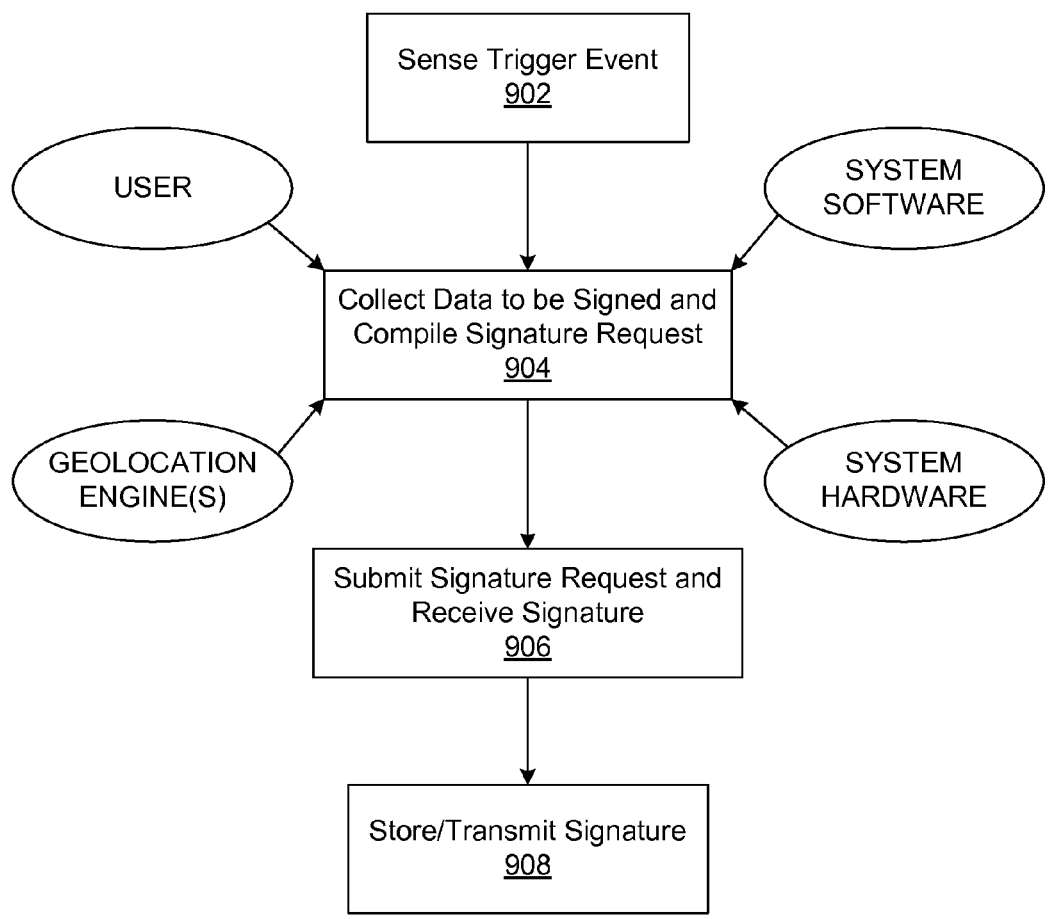
FIG. 5 is a flow diagram of a method for signing geolocation information.

FIG. 5 is a flow diagram of a method 900 for signing geolocation information. The method 900 may begin when it is determined 902 that a trigger event requiring a geolocation to be signed has occurred. Several examples of trigger events are mentioned above. The data—including geolocation parameters and any other predetermined arguments—is then accumulated and formatted 904 as a digital input record, which is submitted 906 to the signing infrastructure. This data record is preferably stored within the device, or transmitted to some supervisory or administrative system, to enable later verification.

Depending on the system used to digitally sign input records, the data comprising the digital input record that gets signed and is later to be verified must be preserved exactly 908; otherwise, even a change in one digital bit, or a change of, for example, longitude, by even a fraction of a second, or even the smallest change in a measured signal strength, might cause a failure of verification. Although not strictly necessary, the information that is used as the basis for a digital input record should therefore preferably be such that a later third-party verifier can extract useful comparative information from it so as to increase the reliability of the verification. For example, if the verifier is unable to correlate ionospheric model data with a stated position, then it might not be relevant and might not be included in an input record, although it could still be stored and presented. In general, the idea is that, given a set of data that is purported to prove the position of the device at the time the data was obtained, a verifier should be able, given that data and its signature, to verify that the data is identical to what led to the signature, and the data itself should correspond to a geolocation with some at least minimum level of certainty or at least credibiltiy.

To reduce the ability for even a sophisticated user to manipulate the data that is digitally signed, it is preferable for the signature generation module 720 to extract geolocation information as directly from the geolocation engine 710 as possible, preferably without any intermediate software or hardware component that is accessible to the user. It would therefore also be possible to combine the geolocation engine 710 and signature generation module 720 into a single and separately programmable component within the device in addition to its existing processor, etc. The lower level data generated by the geolocation engine 710 may accordingly in some embodiments not be made available to the operating system 725 of the device 700 at all and instead may be sent "raw"—transferred as an otherwise unprocessed data block, directly to the signature generation module 720. A software attacker may then be unable to obtain at least some information included in the digital record. Physical access to the hardware may then be required to determine the values of the data being included in the digital record.

The signature generation module 720 may also include information from the device 700 in the digital record. For example, the signature generation module 720 may include a system time from a clock 715 (which may be a separate, dedicated hardware clock used to create an additional time indication used for time corroboration by the module 720) or a network time obtained from the telephone or other network, information from an operating system 725, and/or information from and/or about a storage device 730.

The signature generation module 720 (that is, the executable code used to operate the hardware engine(s), to extract data, and to create requests for signature) may include sufficient information for the device 700 and/or its SIM card to be uniquely identified. Such numbers might include the SIM identifier itself, and/or the phone number associated with it, and/or the serial number of the device, and/or a "secret" number supplied by the manufacturer or preprogrammed into the module 720. In some embodiments, the signature generation module 720 may also include a system time and a time used by the geolocation engine 710 for calculating the geolocation argument in the digital input record. As will become clearer below, depending on how signatures are generated, a signature itself may encode a verifiable indication of the time the signature request was received or the signature was generated.

A digital input record Δ may take the general form:

$$\Delta = \{\Lambda, M, ID, \tau, C\}$$

where Λ is a set of location data; ID is whatever set of data is optionally included to identify the user and/or device and/or geolocation data source(s) (such as GPS satellite or mobile phone tower identifiers), etc.; τ is an optional set of data indicating one or more time measurements; and C is any other optional data included for purposes, for example, of corroboration or simply administration.

A parameter M is also shown in this example for Δ. In some cases, being able to verify the location of the device at a particular time may not be an end in itself, but rather location at the time and also associated with some other message, that is, other data set M. The message M may be any set of digital data that the user also wishes to digitally sign, along with geolocation. For example, a user might want to use the system to "location stamp" a photograph taken with the device, or to prove that, for example, a particular document, or downloadable application, etc., was digitally signed at a particular location. Location-verified photographs (including video-derived) might then be used as evidence that is more credible than what is available now. Similarly, together with other aspects of the digital signature, customers might then feel greater assurance that software they are about to download and install has come from a trusted or permitted location, or not from some somewhere else. Some countries, for example, do not allow import or export of certain types of data files, and the verifiable geolocation capability of embodiments of the invention may make it possible to fulfill reporting and auditing requirements.

Along with a reliable time stamp, the system would then not only be able to verify the time the photograph was taken (or at least not a back-dated time), as well as the location. U.S. patent application Ser. No. 14/094,252, "Non-Deterministic Time Systems and Methods", (the '252 invention) describes a system and method that, with a high degree of reliability, can prevent not only back-dating but also forward-dating of data sets, using, in part the same Guardtime signing infrastructure described below and used here. Combining the present invention and the '252 invention in a single device can therefore provide a system that verifies both time and location better than what is currently available.

The digital record may be digitally signed by submitting the digital record to another party for signing. There are different options for creating such digital signatures. A common signature scheme uses keys that are issued by some certificate authority. The well-known Public Key Infrastructure (PKI) is an example of such a system. One problem with key-based signature schemes is not only the need to store and maintain the key sets, but also that the keys may expire, along with the underlying digital certificates. Another disadvantage of key-based signature schemes is that they require trust of the issuing authority. Still another disadvantage that is likely to rise in severity is that known key-based signature schemes are not quantum-immune, that is, they are not secure against an attack using proposed quantum-computing systems. Although such key-based signatures may be used in embodiments, other, more secure and flexible embodiments use a keyless system of verification for digital certificates.

In one embodiment, the digital record Δ is signed by a distributed, hash tree-based signing infrastructure such as is provided by Guardtime AS of Tallinn, Estonia, which returns a digital signature that enables data verification through recomputation of a logically uppermost value in a hash tree. This infrastructure is described in more detail below. The digital record, digital signature, and/or uppermost hash tree value may be stored, in a storage component 730 (FIG. 10) in the device 700, or in any other entity or entities that might want or need to later confirm the device's location, by the signing infrastructure, etc. Given a purportedly authentic copy of the data record, or the original, together with the data signature, an entity can then verify that the digital record is authentic by recomputing the uppermost hash tree value from the digital signature and the digital record. The digital record, digital signature, and/or uppermost hash tree value may also allow the time the digital record was signed to be verified.

Hash Tree-Based, Keyless Signature Infrastructure

Figure 6:
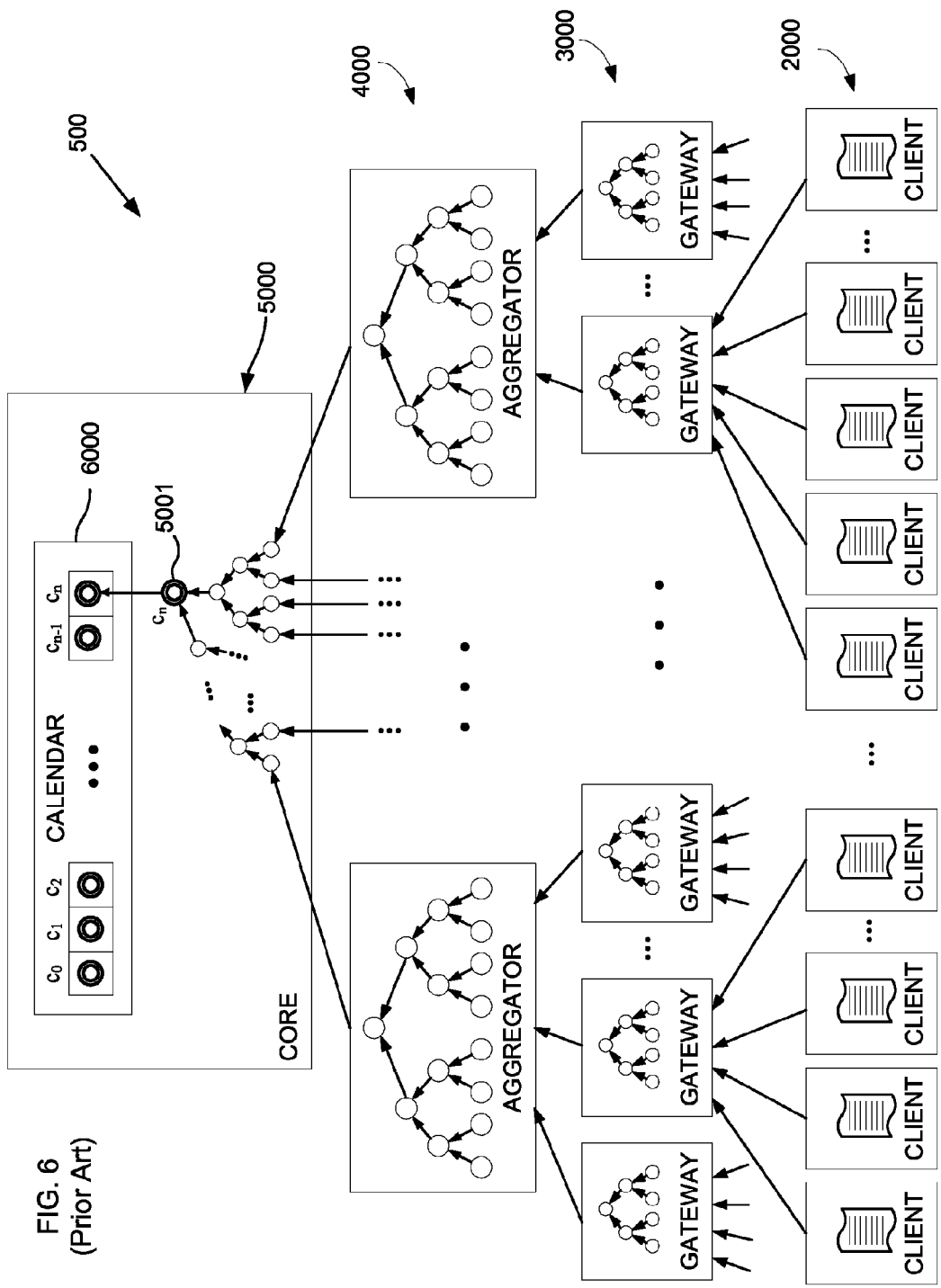
FIG. 6 illustrates various layers of a generalized digital record verification and signing infrastructure.

FIG. 6 illustrates the hash tree infrastructure (the "Guardtime signing infrastructure") that has been developed by Guardtime As of Tallinn, Estonia, and which is disclosed in U.S. Pat. Nos. 8,347,372; 8,312,528; and 7,698,557 (all Buldas, et al., "System and method for generating a digital certificate") as well as U.S. Pat. No. 8,719,576 (also Buldas, et al., "Document verification with distributed calendar infrastructure"), all of which are incorporated herein by reference. In short, the hash tree infrastructure of Bildas '576 may be used to function not only as a signature-generation system 500, but also as a timestamping system too, for any of a plurality of clients 2000. Just for the sake of completeness, the main features of the Guardtime signing infrastructure are summarized here, with reference to FIG. 7.

In the context of embodiments of this invention, either the device 700 itself may comprise a client, or be connected to a system that is or acts as a client and with which the device communicates, such as a server that receives data from an LTE eNodeB, base transceiver station (BTS), etc., or any other type of server that receives and processes signals from the device 700.

Of particular note with respect to the Guardtime hash tree infrastructure is that, except for possible and optional temporary establishment of user or client ID during a session, and optionally temporarily until a time of publication (described below), it does not rely on public/private keys such as RSA in a PKI infrastructure. Keys have several disadvantages: they can expire; they depend on a trust authority (in particular a Certificate Authority that issues the keys); they are mathematically less secure than hash functions; they must be stored and maintained, which leaves them potentially vulnerable to being hacked, in addition to the problem of requiring increasing storage space in devices in which this may be a scarce resource; they must be made available to a third party who wishes to verify the key-signed data; moreover, recent research indicates that some keys may have "back doors" embedded in them, or may be generated using comprised pseudo-random number seeding routines, such that these back doors are unknown to users.

The general Guardtime infrastructure has several different layers: a client layer 2000 comprising a number of client systems; a layer of gateways 3000; a layer including one or more aggregation systems 4000; and an uppermost layer 5000 that includes a "core". Typically, the gateways, aggregators and the core will be servers, with known network connections and network communication hardware and software.

The client systems may also be servers, but, depending on the implementation, some or all may also be more individualized workstations, laptop, personal or other mobile computing devices, etc.; in particular here, the mobile device 700 may comprise or be associated with one of the client systems. A client 2000 may be any system where a representation of any type of information is input, created or otherwise presented (with or without human involvement) in digital form such that it can be processed and registered using the infrastructure according to the invention. In the illustrated arrangement, a client is the system where digital records are prepared and entered into the verification/signature system. A digital record may be any set of binary data that one later wishes to verify has not changed since initial registration and signing using the infrastructure.

Although FIG. 6 shows the various layers as being separate and distinct, some implementations of the main principles of the infrastructure might consolidate or do without some of the layers or might need to add additional layers for administrative or other purposes. A gateway in the layer 3000 will typically be a computer system such as a server with which one or more of the clients communicates so as to receive requests for registration of digital records that its clients submit. An aggregator in the aggregation layer 4000 will similarly be a computer system such as a server intended to receive registration requests that have been consolidated by respective gateways. The distinction between aggregators and gateways will often depend on which entities control each, but this is not necessary and in some implementations there is no control or functional differences between the two types of systems.

Figure 7:
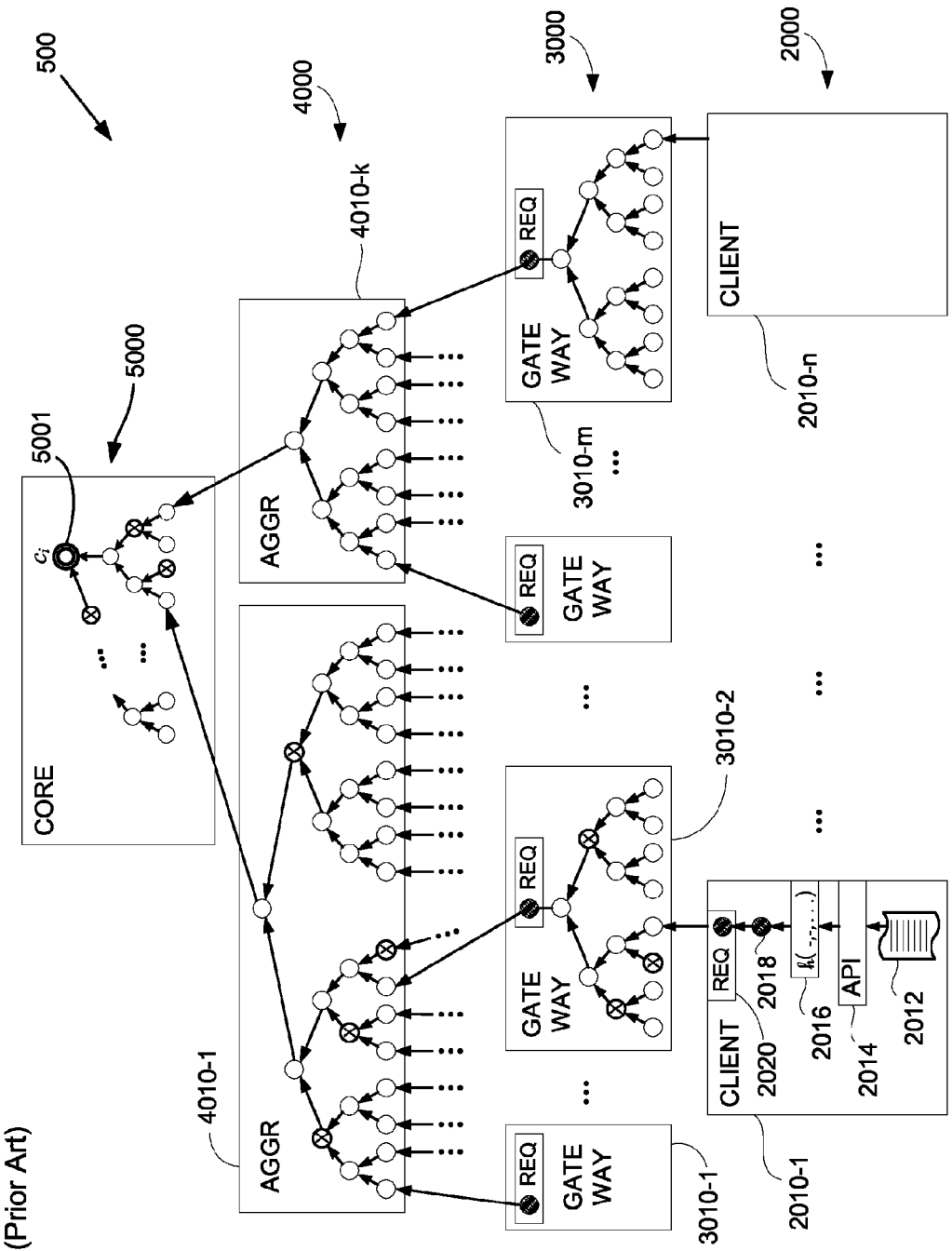
FIG. 7 illustrates the verification infrastructure along with various data and computational structures maintained and computed within different layers.
Figure 8:
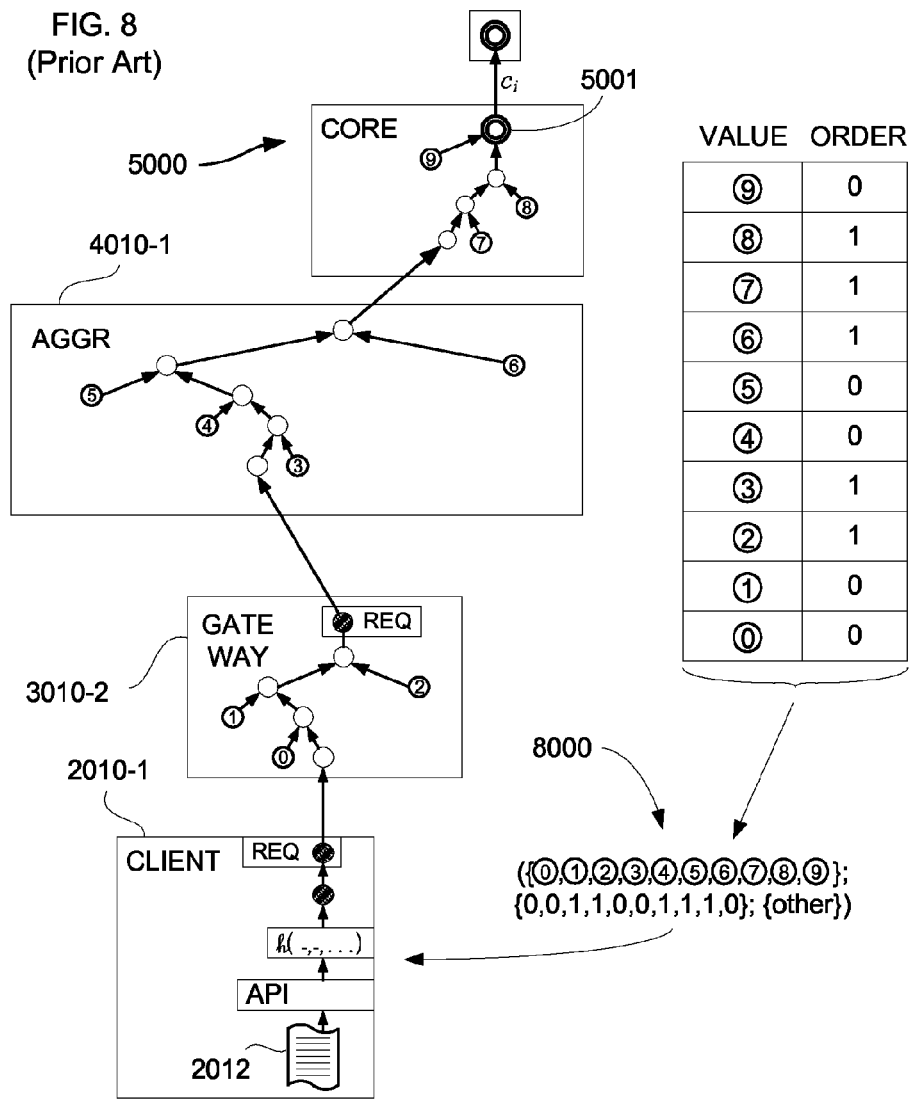
FIG. 8 shows a subset of FIG. 7 to illustrate a digital signature and recomputation of authentication values using the signature.
Figure 9:
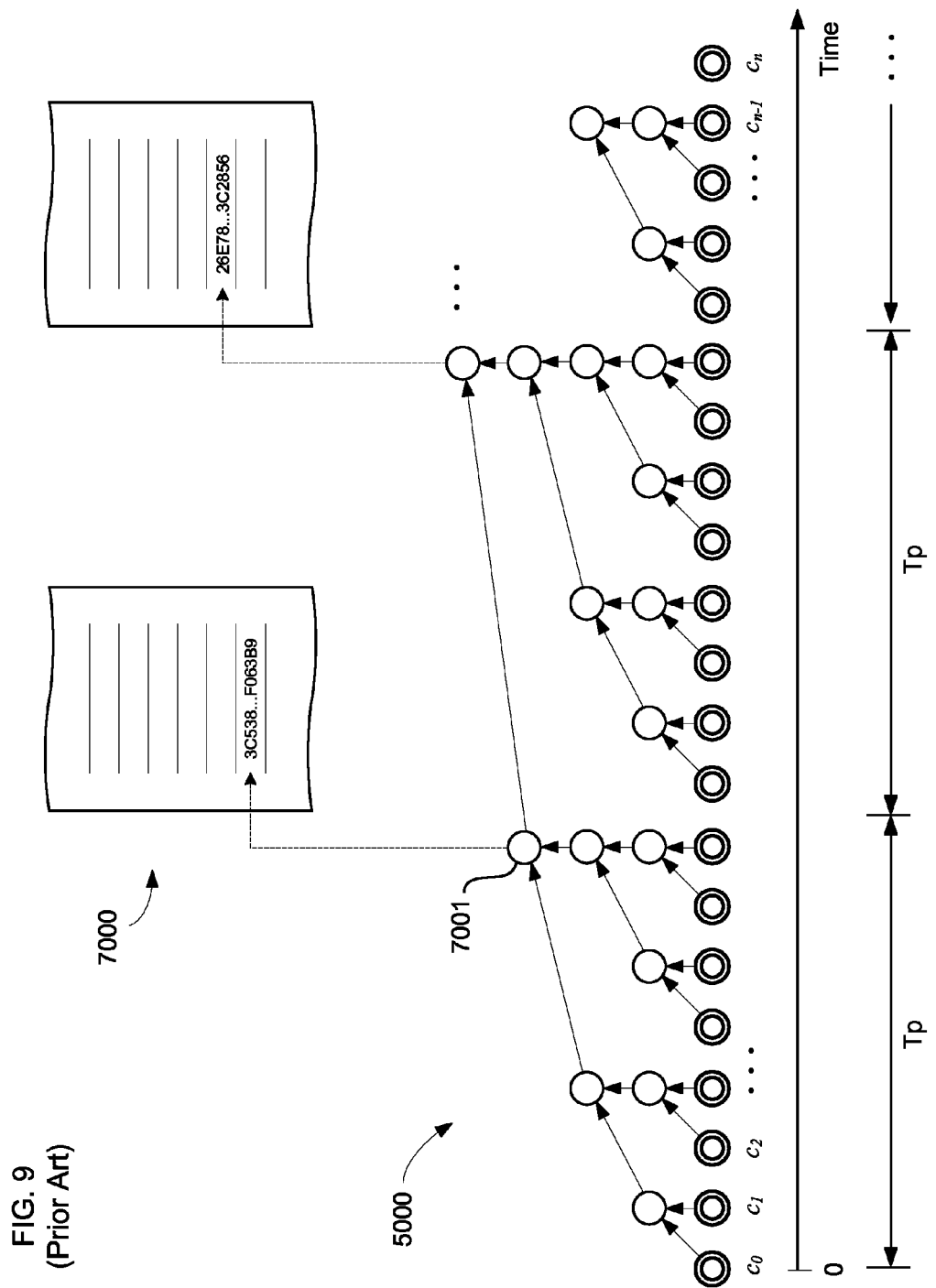
FIG. 9 illustrates optional publication to enable permanent, trust-free authentication.

In FIG. 7, various clients are represented as 2010-1, . . . , 2010-$n$; gateways are represented as 3010-1, 3010-2, . . . , 3010-$m$; and two aggregators are shown as 4010-1, 4010-$k$. An aggregator will typically communicate into a respective one of the lowest level hash tree nodes within the core, as described in more detail below. Only two aggregators are shown in FIG. 7 for the sake of simplicity.

Each client system 2000 that wishes to use the verification infrastructure may be loaded with a software package or internal system routines for convenient or even automatic communication and submission "upwards" of digital information. In the context of this invention, the client system 2000 may be the client 200. The software package may include some application program interface (API) 2014 that transforms submitted digital records into a proper form for processing. A digital record 2012 is then submitted by way of the API 2014 to a software module 2016 that uses the digital data from the record 2012 as at least one argument in a transformation function 2018 such as a hash function.

The data structure of a binary hash tree is illustrated within the gateway 3010-2. The lowest level nodes of the gateway hash tree will correspond to the transformed dataset 2018 submitted as a request REQ from a client, along with any other parameters or data used in any given implementation to form a request. As illustrated, the values represented by each pair of nodes in the data structure form inputs to a parent node, which then computes a combined output value, for example, as a hash of the two input values from its "children" nodes. Each thus combined output/hash value is then submitted "upward" as one of two inputs to a "grandparent" node, which in turn computes a combined output/hash value for these two inputs, and so on, until a single combined output/hash value is computed for the top node in the gateway.

Aggregators such as the system 4010-1 similarly include computation modules that compute combined output values for each node of a hash tree data structure. As in the gateways, the value computed for each node in the aggregator's data structure uses its two "children" nodes as inputs. Each aggregator will therefore ultimately compute an uppermost combined output value—a "root hash value"—as the result of application of a hash function that includes information derived from the digital input record(s) of every client that submitted a request to a gateway in the data structure under that aggregator.

In many cases, the core 5000 is maintained and controlled by the overall system administrator. Within the core, a hash tree data structure is computed using the root hash values of the aggregators as lowest level inputs. In effect, the hash computations and structure within the core form an aggregation of aggregation values. The core will therefore ultimately compute a single current uppermost core hash value at the respective tree node 5001 at each of a sequence of calendar time intervals $t0, t1, \ldots, tn$. This uppermost value is referred to here alternatively as the "calendar value" c, or "current calendar value" for the time interval $ti$. If calendar values are computed according to precisely determined time values, such as one calendar value each 1.0 s, then each calendar value will also be a precise representation of time.

In short, each digital signature issued in a given calendar interval will intrinsically and provably be tied to a particular calendar value. Due to the essentially non-invertible nature of cryptographic hash functions, this time association will be as essentially impossible to fake as the data that led to the corresponding signature itself.

If the signature request includes a time parameter, such as the time of the device clock 715, then this may later be compared with the calendar time of the request. If the device time differs from the calendar time more than some acceptable amount, taking into account any signal and network propagation delays, then this may serve as an indication that the device time may have been manipulated, for example, by back- or forward-dating, or that some other parameter in the request Δ was received so much later after the others that the data comprising the request Δ itself is suspicious. The relationship between calendar values and the time used by one or more transmitters with known locations may be known, and/or the processing delay of the signature generation module 720 and the signing infrastructure may be at least approximately known.

Note that the uppermost tree node 5001 represents the root node of the entire tree structure of nodes junior to it. This will change upon recomputation of a new uppermost core hash value at the end of the next period of accumulating requests and generating signature vectors (also referred to as "data signatures") containing recomputation parameters. In one configuration of the Guardtime signature infrastructure, illustrated in FIG. 9, the core system 5000 combines the sequence of calendar values c, during each of a series of time intervals ("calendar periods") $T_p$ using a Merkle hash tree 7002 (FIG. 10) to form a combined uppermost hash value 7001, which will encode information from every calendar value, and thus every digital input record, ever submitted to the infrastructure for signature up to the end of the current calendar period. Periodically, the combined uppermost hash value may then be published in some substantially unalterable medium 7000, such as a newspaper, publicly accessible database or web site, some internal database or publication (such as within an enterprise or government agency), etc., such that, once the value is published, it would be practically impossible to fraudulently alter what was published; for example, it would in practice be impossible to retrieve and change every copy of a newspaper that has been distributed to the public.

In FIG. 7, certain ones of the hash tree nodes in the gateway 3010-2, the aggregator 4010-1, and the core 5000 are marked with an "X". Notice if one traverses the various tree paths upward from the value 2018 in the client 2010-1, it is possible to compute every value upward in the tree structures all the way to the most current uppermost core value 5001 given the values in the X-marked tree nodes (the "siblings" of the nodes in the direct recomputation path) and a knowledge of the hash functions applied at each successive parent node. In short, if a signature is associated with the digital record 2012 that includes all of the "X-marked" values, and assuming predetermined hash functions, then re-computation of the hash values upward through all of the tree structures will yield the same value as in the current calendar value, but only if the starting input value representing the original digital record is in fact identical in every respect to the original. Even the slightest alteration to the digital input record or even a change of a single bit in any of the values of the signature associated with a record 2012 will lead to a re-computed calendar value that is not identical to the one in node 5001. Note also that each uppermost computed value in the core—the current calendar value—contains information derived from every digital input record that is input into the system during the current calendar time interval.

Figure 10:
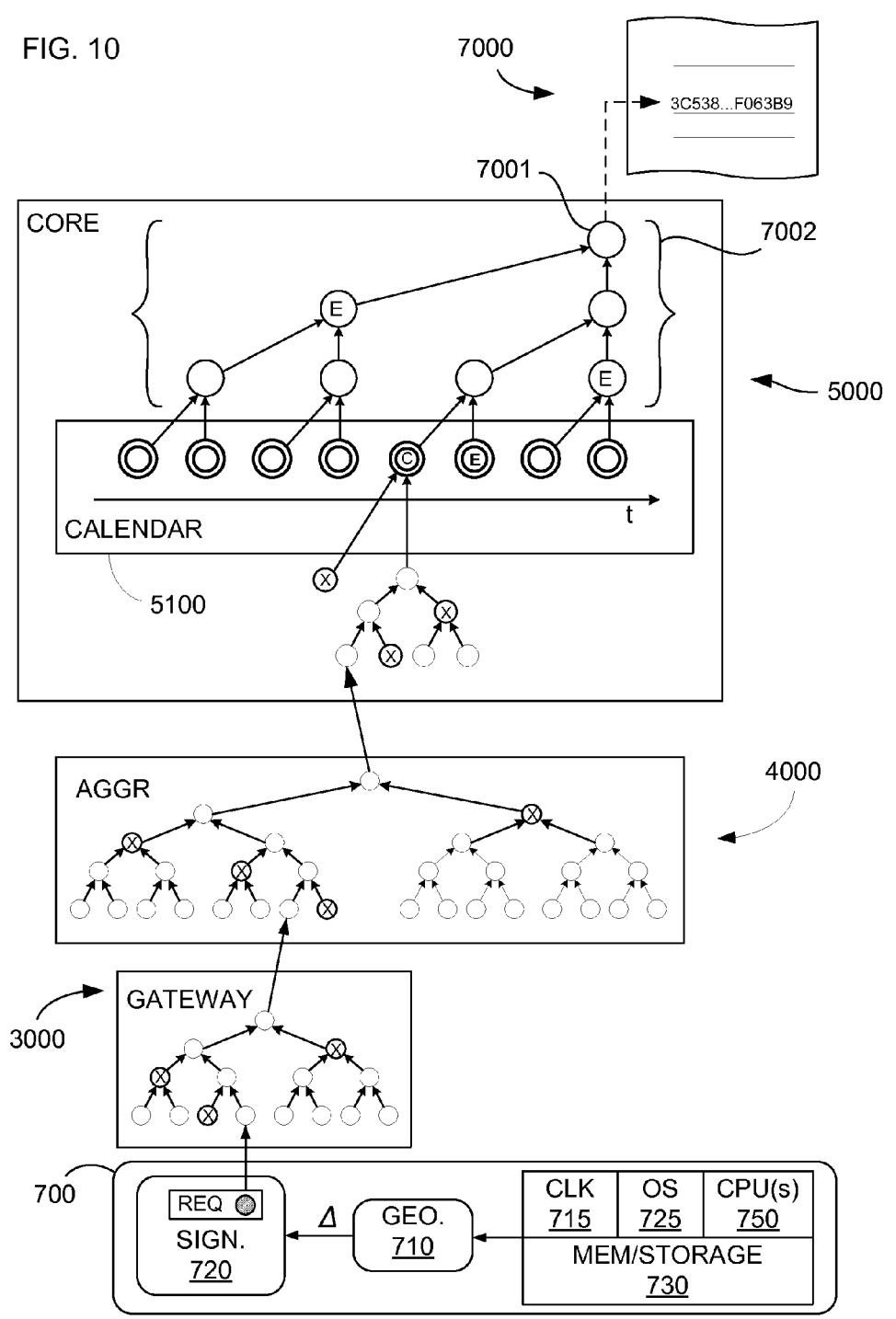
FIG. 10 illustrates use of a digital signature to enable system-independent authentication by recomputation.

The set of sibling hash values, along with any other information such as order (such as "left"/"right", since most cryptographic hash functions are not commutative), that enable recomputation of the corresponding calendar value, may then be returned to the client system as the signature 8000 (FIG. 8) for the digital input. This signature may later be extended with the sibling values within the core's Merkle hash tree that allow recomputation all the way up through the infrastructure to the uppermost hash value 7001 of the core 5000 for the corresponding calendar period. FIG. 10 illustrates this option, in which the "X-marked" sibling values in a digital signature may be extended with the "E-marked" sibling values to enable recomputation all the way up to the published value 7001. Note that, at that point, it will in practice be impossible to alter an input in any way without this being detectable: Even if an exceptionally sophisticated and malicious entity were to try to manipulate every value in the calendar so as to create a fake calendar value that made the fake input seem correct, then this would still not avoid detection, since the published value 7001 will in general be impossible to change as well.

Assume now by way of example that some entity later wishes to verify that a digital record in question—a "candidate digital record"—is an identical copy of digital record 2012. Applying the same transformation function 2016 to the candidate digital record and recomputing upward using the corresponding data signature, the entity should compute to the exact same calendar value, or publication value 7001 that resulted from the original digital record's request.

Applying this signature solution in the context of this invention, assume that some entity purports that a data record Δ* is the same as the data record Δ. This could be the original data set Δ, stored, for example, within the memory/storage component 730 of the device 700 itself, and/or a copy stored elsewhere by a different entity altogether. The corresponding digital signature for Δ may similarly be stored locally, in storage 730, and/or externally.

Put more plainly, as an example, assume that a user says "This device was at location L at time t and the information included in Δ* is proof." The question then is whether this is correct, that is, that L is the same as A for the device with identity ID at time T. With Δ* and the digital signature received from the signature infrastructure for Δ, a verifier can then recompute the chain of hash values "upward" to a final, uppermost value. (Note that this may even be done offline and does not necessarily require querying the signing infrastructure again, depending on the given implementation.) Δ* will then be the same as Δ only if recomputation leads to the identical corresponding calendar value or, if the signature was extended, to the correct corresponding published value 7001. Using the Guardtime signing infrastructure as shown in FIGS. 6-10, this can be done without dependence on keys, and may in some implementations even be done offline, without having to rely on the signing infrastructure again, and assuming all hash functions are specified or known. Even so, the signatures themselves are created not within clients themselves, which is more open to malicious manipulation or attack, but rather within external entities, in particular, the gateway(s), aggregator(s) and core; in short, the data signatures created by the Guardtime infrastructure are created server-side, albeit of course with client-input data record as the basis of the signature.

Figure 11:
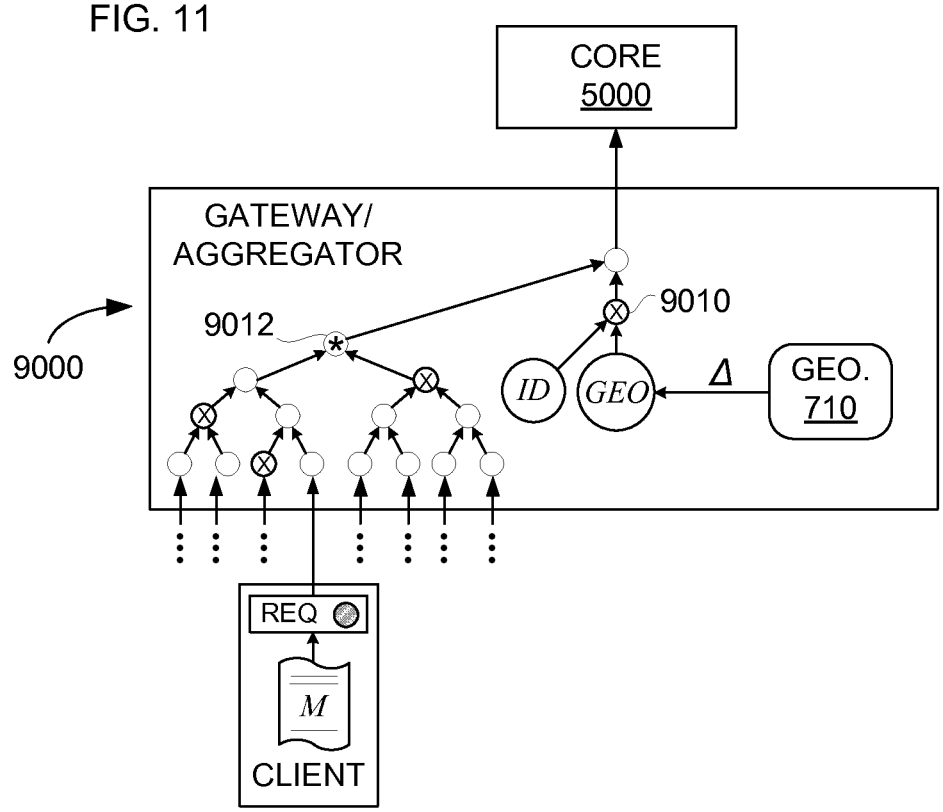
FIG. 11 shows how the location of a server in a data authentication infrastructure can be included as a parameter in a recomputation path for signed digital data.

FIG. 11 illustrates how the hash tree signing infrastructure of FIGS. 6-10 can be augmented with geolocation data Δ (or maybe just Δ) for the current calendar period by inputting and hashing this data into the tree as a node GEO within the hash sub-tree within one or more of the gateway(s) and/or aggregator(s). An identifier ID for each respective gateway/aggregator may also be included as a node, or may be included within the data set Δ. The geolocation data for the current calendar period will then be encoded in the data signatures for every data record for which the "location node" 9010 (with or without other data) is a sibling in the recomputation path, that is, for all signatures for clients submitting signature requests via nodes below the node 9012 marked "*" in FIG. 11.

One other consequence of the embodiment shown in FIG. 11 is that the server (gateway/aggregator) itself becomes the device 700 whose location is established. It would also additionally be possible for the gateway/aggregator to request and get a digital signature for its own geolocation data Δ. The locations signatures may then be stored in the sever itself or sent to some other entity for later verification.

The various operations of the geolocation component 710 described above, for example, extracting and compiling the data that comprises each Δ, submitting it for signature, receiving and storing the signature, etc., will be carried out by executing, for example, in one or more processors 750 (FIG. 10), corresponding executable code, under the direction of some system software such as an operating system 725, that may be stored in a non-transitory, volatile and/or non-volatile computer-readable medium such as the memory/storage component 730, which may be implemented using any known storage technology or combination of technologies. The code that embodies the different embodiments of the invention may be incorporated into the device 700 at the time of manufacture and initial software configuration, and/or it may be installed as a computer program product either then, or later.

The invention claimed is:

1. A method for providing proof of location of a device, the method comprising:
    forming at least one set of location data from signals from at least one geolocation engine;
    forming a digital record from parameters that include at least the set(s) of location data;
    submitting the digital record as part of a request for digital signature to a hash tree-based, keyless signature infrastructure; and
    receiving from the signature infrastructure a digital signature for the digital record;
    in which the digital signature encodes a signature time, further comprising including as a parameter in the digital record at least one locally derived time value, such that location of the device at the locally derived time is verifiable only if the locally derived time differs by no more than a maximum allowable amount from the signature time.

2. The method of claim 1, in which the location data includes a plurality of location data sets received from a corresponding plurality of independent geolocation engines.

3. The method of claim 1, further comprising extracting the location data set(s) from respective geolocation engines within the device itself.

4. The method of claim 1, in which at least one of the location data sets includes GPS-derived signal information.

5. The method of claim 1, in which at least one of the location data sets includes signal information derived from a determination of relative signal strengths from a plurality of land-based transmission systems.

6. The method of claim 1, in which at least one of the location data sets includes signal information derived from a determination of relative times of signal transit from a plurality of transmission systems.

7. The method of claim 1, further comprising extracting and forming at least one of the sets of location data from signals from the respective geolocation engine independent of prior processing by operating system software within the device.

8. The method of claim 1, further comprising determining the locally derived time from the signal from at least one of the geolocation engine(s).

9. The method of claim 1, in which a purported copy of the digital record is identical to the digital record only if iterative, pairwise hashing of the purported copy with sibling hash values within the digital signature leads to recomputatation of a calendar value for a calendar period in which the digital signature was created, said calendar value being an uppermost current hash value of the hash tree-based, keyless signature infrastructure.

10. The method of claim 9, in which the parameters forming the digital record include a message, said message comprising a data set with which a location is to be verifiably associated.

11. The method of claim 1, in which the digital record comprises data inaccessible to a user of the system.

12. The method of claim 1, further comprising submitting the digital record for signature only if and after sensing the occurrence of a trigger event.

13. The method of claim 12, in which the trigger event is initiated by a user of the device.

14. The method of claim 12, in which the trigger event is initiated by an entity other than a user of the device.

15. The method of claim 14, in which the trigger event and the subsequent formation and submission of the data record is initiated without user knowledge.

16. The method of claim 12, further comprising sensing the trigger event as a signal received from a system other than the device itself.

17. A non-transitory, computer-readable medium comprising program code, which, when executed by a processor within a device, causes the processor to perform a method for providing proof of location of the device, the method comprising:
    forming at least one set of location data from signals from at least one geolocation engine;
    forming a digital record from parameters that include at least the set(s) of location data;
    submitting the digital record as part of a request for digital signature to a hash tree-based, keyless signature infrastructure; and
    receiving from the signature infrastructure a digital signature for the digital record;
    in which the digital signature encodes a signature time, further comprising code causing the processor to include as a parameter in the digital record at least one locally derived time value, such that location of the device at the locally derived time is verifiable only if the locally derived time differs by no more than a maximum allowable amount from the signature time.

18. The computer-readable medium of claim 17, in which the location data includes a plurality of location data sets received from a corresponding plurality of independent geolocation engines.

19. The computer-readable medium of claim 17, further comprising code causing the processor to extract the location data set(s) from respective geolocation engines within the device itself.

20. The computer-readable medium of claim 17, in which at least one of the location data sets includes GPS-derived signal information.

21. The computer-readable medium of claim 17, in which at least one of the location data sets includes signal information derived from a determination of relative signal strengths from a plurality of land-based transmission systems.

22. The computer-readable medium of claim 17, in which at least one of the location data sets includes signal information derived from a determination of relative times of signal transit from a plurality of transmission systems.

23. The computer-readable medium of claim 17, further comprising code causing the processor to extract and form at least one of the sets of location data from signals from the respective geolocation engine independent of prior processing by operating system software within the device.

24. The computer-readable medium of claim 17, further comprising code causing the processor to determine the locally derived time from the signal from at least one of the geolocation engine(s).

25. The computer-readable medium of claim 17, in which a purported copy of the digital record is identical to the digital record only if iterative, pairwise hashing of the purported copy with sibling hash values within the digital signature leads to recomputatation of a calendar value for a calendar period in which the digital signature was created, said calendar value being an uppermost current hash value of the hash tree-based, keyless signature infrastructure.

26. The computer-readable medium of claim 25, in which the parameters forming the digital record include a message, said message comprising a data set with which a location is to be verifiably associated.

27. The computer-readable medium of claim 17, in which the digital record comprises data inaccessible to a user of the system.

28. The computer-readable medium of claim 17, further comprising submitting the digital record for signature only if and after sensing the occurrence of a trigger event.

29. The computer-readable medium of claim 28, in which the trigger event is initiated by a user of the device.

30. The computer-readable medium of claim 28, in which the trigger event is initiated by an entity other than a user of the device.

31. The computer-readable medium of claim 30, in which the trigger event and the subsequent formation and submission of the data record is initiated without user knowledge.

32. The computer-readable medium of claim 28, further comprising sensing the trigger event as a signal received from a system other than the device itself.

33. A system for geolocation of a device comprising:
at least one geolocation engine, each generating location signals corresponding to the location of the device;
a signature sub-system configured for forming a digital record from at least one set of location data from the location signals from the at least one geolocation engine and submitting the digital record as part of a request for digital signature to a hash tree-based, keyless signature infrastructure; and for receiving from the signature infrastructure a digital signature for the digital record; and
a clock component generating a local time signal, whereby the signature sub-system includes a locally derived time as a parameter in the digital record, such that location of the device at the locally derived time is verifiable only if the locally derived time differs by no more than a maximum allowable amount from a signature time associated with the digital signature.

34. The system of claim 33, comprising a plurality of geolocation engines each generating the location signals independently.

35. The system of claim 33, in which geolocation engines are within the device itself.

36. The system of claim 33, in which at least one of the geolocation engines is a GPS receiving and processing system.

37. The system of claim 33, in which at least one of the geolocation engines includes a processing system for determining relative signal strengths from a plurality of land-based transmitters.

38. The system of claim 33, in which at least one of the geolocation engines includes a processing system for determining relative times of signal transit from a plurality of transmission systems.

39. The system of claim 33, in which signature sub-system extracts and forms at least one of the sets of location data from signals from the respective geolocation engine independent of prior processing by operating system software within the device.

40. The system of claim 33, in which a purported copy of the digital record is identical to the digital record only if iterative, pairwise hashing of the purported copy with sibling hash values within the digital signature leads to recomputatation of a calendar value for a calendar period in which the digital signature was created, said calendar value being an uppermost current hash value of the hash tree-based, keyless signature infrastructure.

41. The system of claim 40, in which the parameters forming the digital record include a message, said message comprising a data set with which a location is to be verifiably associated.

42. The system of claim 33, in which the digital record comprises data inaccessible to a user of the system.

43. A method for enabling authentication of digital records, comprising:
receiving, at a core system on a core processing level, from each of at least one highest non-core processing system at a respective highest non-core processing level, a current highest-level combined hash value that is iteratively formed as hashes of successively lower-level combined hash values computed in lower non-core processing levels as node values of a tree data structure having lowest level inputs formed as digital transformations, computed in user-level systems, of digital input records;
including, as at least one parameter in a digital record input to at least one geolocated node, location data from at least one geolocation engine, said location data indicating a location of the computer system in which the hash computation corresponding to the geolocated node is computed;
computing a current calendar value as a hash of the current highest-level combined hash values; and
returning to at least the highest non-core processing level from the core system the current calendar value, whereupon recomputation parameters are distributed downward to the user-level systems for association with respective ones of the digital input records as respective digital signature such that an arbitrary subsequent test digital record is considered authenticated relative to the corresponding digital input record if, using the recomputation parameters in the digital signature together with the test digital record to recompute the node values upward through the tree data structure and core, the same current calendar value is attained as when it was originally computed with the corresponding digital input record forming the lowest level input;

encoding in the digital signature a signature time by including as a parameter in the digital record at least one time value locally derived in a device, such that location of the device at the locally derived time is verifiable only if the locally derived time differs by no more than a maximum allowable amount from the signature time;

whereby digital signatures for digital records submitted by user-level systems for which the geolocated node lies in a recomputation path in the tree data structure encode the location data of the geolocated node as well as a time of generation of the location data.

* * * * *